United States Patent [19]

Sawase et al.

[11] Patent Number: 5,194,725
[45] Date of Patent: Mar. 16, 1993

[54] IMAGE SENSOR INCLUDING RESILIENT PRESSING MEANS FOR PRESSING A LIGHT RECEIVING SENSOR SUBSTRATE AGAINST AN IMAGE SENSOR FRAME

[75] Inventors: Kensuke Sawase; Masaya Imamura, both of Kyoto, Japan

[73] Assignee: Rohm Co., Ltd., Kyoto, Japan

[21] Appl. No.: 820,796

[22] Filed: Jan. 15, 1992

[30] Foreign Application Priority Data

Jan. 17, 1991 [JP] Japan ................................ 3-016974

[51] Int. Cl.$^5$ .............................................. H01J 40/14
[52] U.S. Cl. ................................. 250/208.1; 250/239
[58] Field of Search ............... 250/208.1, 239, 211 R; 358/213.11, 482, 483, 484; 357/79

[56] References Cited

U.S. PATENT DOCUMENTS

| | | | |
|---|---|---|---|
| 4,839,730 | 6/1989 | Shirakoshi et al. | 358/483 |
| 4,977,313 | 12/1990 | Nagata et al. | 250/208.1 |
| 5,038,027 | 8/1991 | Ioka | 250/208.1 |

Primary Examiner—David C. Nelms
Assistant Examiner—John R. Lee
Attorney, Agent, or Firm—Fish & Richardson

[57] ABSTRACT

An image sensor includes a frame 1, a light source unit 4 located in the frame 1 for irradiating light onto an original A to be read, a light receiving sensor 5 located in the frame 1 and including a plurality of light receiving portions arranged therein, and an optical system 6 located in the frame 1 for causing the light from the original A to be received by the light receiving portions in the light receiving sensor. The image sensor also includes at least one positioning portion formed in the frame 1 at an appropriate location and used to mount the light receiving sensor substrate 3 in the frame 1 and a stopper engaging and receiving portion 12 formed in the frame at an appropriate location. A leaf spring 2 has a stopper 21 formed thereon for detachably engaging the stopper engaging and receiving portion. The light receiving sensor substrate 3 properly positioned in the frame relative to the positioning portion 11 is resiliently biased against the frame. Thus, the light receiving sensor substrate can be detachably mounted and held in the frame.

13 Claims, 4 Drawing Sheets

IMAGE SENSOR INCLUDING RESILIENT PRESSING MEANS FOR PRESSING A LIGHT RECEIVING SENSOR SUBSTRATE AGAINST AN IMAGE SENSOR FRAME

BACKGROUND OF THE INVENTION

1. Field of the Invention

The present invention relates to a structure for holding an image sensor used to read an original in a facsimile terminal and more particularly to such a structure possessed by the image sensor itself so as to mount its light receiving sensor substrate on a frame (in the main body of the image sensor).

2. Description of the Related Art

FIG. 4 is a cross-sectional view of the primary part of an image sensor constructed according to the prior art, taken along a plane perpendicular to the direction of scan. The image sensor comprises a light source unit 4 for illuminating an original A, a light receiving sensor 5 including a plurality of light receiving portions arranged therein, and an optical system 6 for causing the light from the original A to be received on the light receiving portions in the light receiving sensor 5, these components being mounted in a frame 1. The light source unit 4 includes a resilient element 44 which will be brought into contact with the optical system 6 under pressure when the resilient element 44 is resiliently deflected. The optical system will be fixedly pressed against a wall 1a in the frame 1. Further, the light source unit 4 itself is resiliently biased against a wall 1b in the frame 1.

The light source unit 4 comprises an LED chip 42 die bonded on a substrate 41 and a plastic lens 43. Light emitted from the light source unit 4 is adapted to illuminate a transparent glass plate 7 located on the top of the frame, that is, the original A placed thereon with an angle of about 45 degrees. Light reflected by the original A is received by the light receiving sensor 5 (which is a photodiode array chip die bonded on a substrate 3) located on the bottom of the frame through the optical system 6 which is a refractive index gradient type lens array. The light receiving sensor 5 converts the received light into an electric signal.

In such a prior art image sensor, the light receiving sensor substrate 3 is positioned in contact with the bottom face of the frame 1 and fixed to the frame 1 by means of machined screws 8. In general, the material of the image sensor frame 1 (which is usually of aluminum alloy or plastic) is different from that of the light receiving sensor substrate 3, naturally leading to a difference of thermal expansion coefficient. When the substrate 3 screwed to the frame 1 expands or contracts due to change of temperature, the substrate 3 may be deformed at a position between any adjacent machined screws 8, that is, at any portion not held by the machined screws. The use of the machined screws requires the machining of threaded apertures both in the frame and substrate 1, 3 and renders the mounting operation troublesome, leading to an increase in the manufacturing cost.

SUMMARY OF THE INVENTION

It is therefore an object of the present invention to provide an image sensor which can simplify the mounting of the light receiving sensor substrate on the image sensor frame and be manufactured inexpensively by decreasing the number of machining steps.

To this end, the present invention provides an image sensor comprising a frame and a light receiving sensor substrate pressed against the frame under pressure, resulting in the avoidance of any screws for fastening the light receiving sensor substrate to the frame.

In order to press the light receiving sensor substrate against the frame under pressure, the frame comprises means for receiving and positioning the light receiving sensor substrate, means for pressing the light receiving sensor substrate against the positioning means and means for fixedly holding the pressing means. On production of the image sensor according to the present invention, the light receiving sensor substrate is mounted on the frame positioning means and the pressing means is provided so as to press the light receiving sensor substrate against the frame under pressure. Since the pressing means is fixed to the stationary part of the frame, the light receiving sensor substrate is pressed against and held by the frame. In such a manner, the light receiving sensor substrate can be detachably mounted on the frame.

More particularly, the image sensor of the present invention comprises a light source unit for illuminating an original, a light receiving sensor including a plurality of light receiving portions arranged therein, and an optical system for causing the light from the original to be received by the light receiving portions in the light receiving sensor, all the components being mounted on the frame. The frame includes a positioning portion for mounting the light receiving sensor substrate on the frame and a stopper engaging and receiving portion, these portions being formed in the frame at appropriate locations. The image sensor also comprises a leaf spring having a stopper which can separatably engage the stopper engaging and receiving portion. The leaf spring resiliently biases the light receiving sensor substrate against the frame after it has be appropriately positioned on the frame. In such a manner, the light receiving sensor substrate can be detachably held against the frame.

The frame of the image sensor may further include a cavity formed therein at the bottom for receiving the light receiving sensor substrate and leaf spring. The top of the receiving cavity is provided with positioning means for the light receiving sensor substrate (which serves to position the light receiving sensor in association with the optical system) while the bottom of the receiving cavity includes an engaging step adapted to be engaged by the stopper of the leaf spring. The leaf spring may be of a rectangular flat plate which is formed integrally with the stopper extending at a right angle from the frame body. On mounting, the light receiving sensor substrate is first inserted into the receiving cavity such that the light receiving sensor substrate will engage, at one end, the positioning means (recess). Thus, the light receiving sensor substrate is properly positioned on the frame. In such a state, the leaf spring is inserted into the receiving cavity from the end of the frame opposite to the light receiving sensor substrate. The end of the leaf spring opposite to the stopper formed therein is then engaged by the part of the receiving cavity opposite to the engaging step to be engaged by the stopper of the leaf spring. The leaf spring is further moved into the receiving cavity using the part thereof as a fulcrum. Thus, the leaf spring will be deformed and curved within the receiving cavity. The central portion of the curved leaf spring will engage the forward face of the light receiving sensor substrate which is in turn pressed against the bottom face of the frame under pressure. Thereafter, the end of the leaf spring having the stopper is moved into the receiving cavity with the stopper being engaged by the engaging step. In such a manner, the light receiving sensor substrate can be firmly held by the leaf spring within the receiving cavity of the frame. This makes the positioning of the light receiving sensor substrate more accurate and enables the light receiving sensor substrate to be held in the frame in a simplified manner.

DETAILED DESCRIPTION OF THE PREFERRED EMBODIMENTS

Figure 1:
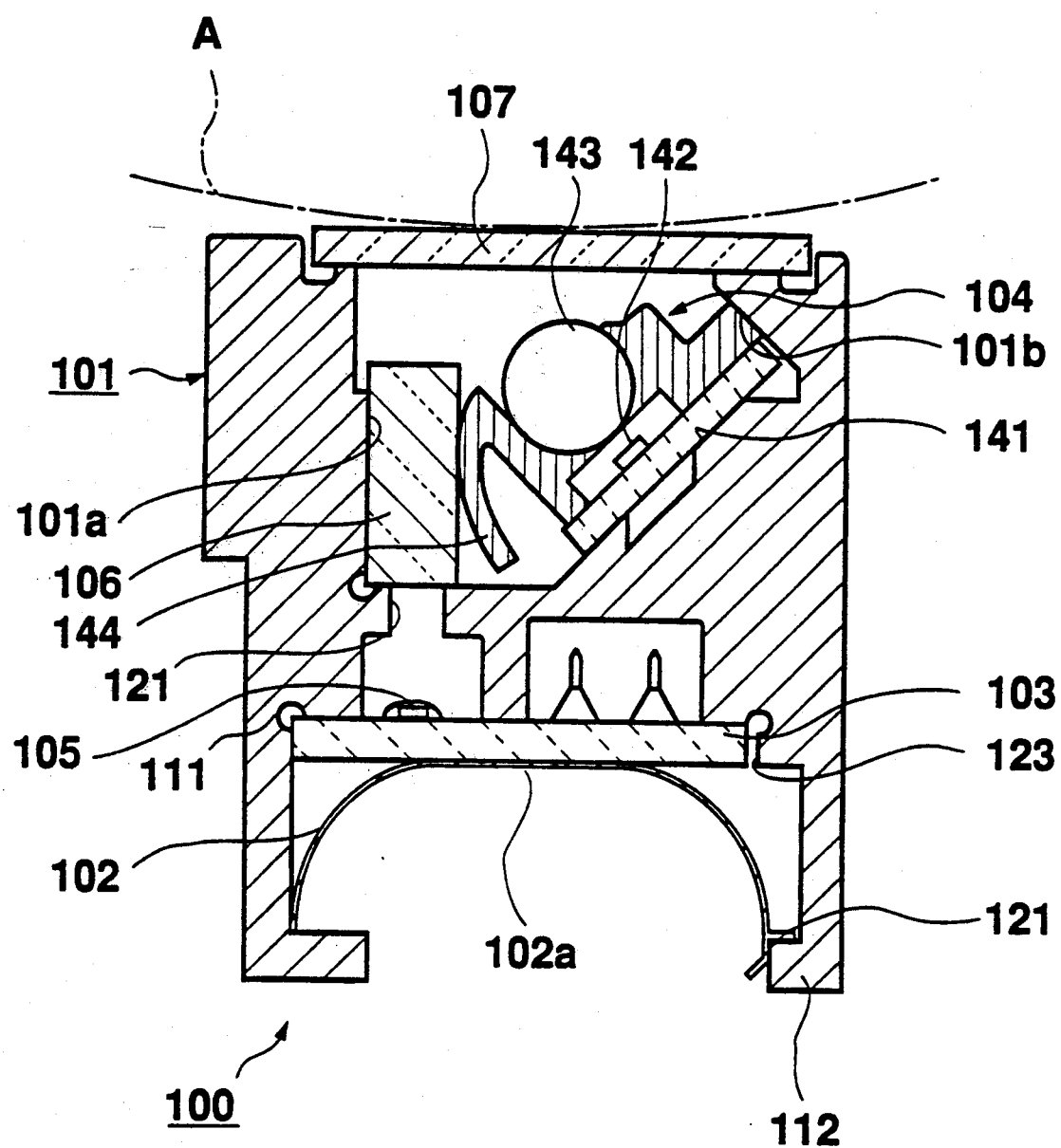
FIG. 1 is a cross-sectional view of the primary parts of an image sensor which is the first preferred embodiment of the present invention.

Referring first to FIG. 1, there is shown an image sensor 100 which is the first preferred embodiment of the present invention and which comprises a frame 101, a light source unit 104 disposed in the frame for illuminating an original A, a light receiving sensor 105 located in the frame and including a plurality of light receiving portions arranged therein, and an optical system 106 positioned in the frame for causing the light from the original A to be received by the light receiving portions in the light receiving sensor. The light source unit 104 includes a resilient element 144 formed therein. When the resilient element 144 is engaged and resiliently deformed by the optical system 106, the latter will be pressed against one wall 101a of the frame 101 under pressure. Furthermore, the light source unit 104 itself will be also pressed against another wall 101b of the frame 101 under pressure. In such a manner, the light source unit and optical system 104, 106 can be firmly held against the frame 101 under the influence of the resilient element 144.

The light source unit 104 comprises a substrate 141, an LED chip 142 die bonded onto the substrate 141 and a plastic lens 143. Light emitted from the light source unit 104 is directed to a transparent glass plate 107 located on the top of the frame 101, and thus the original A placed thereon, at an angle of about 45 degrees. After being reflected by the original A, the light passes through the optical system 106 (which is preferably a refractive index gradient type lens array) and is received by the respective light receiving portions of the light receiving sensor 105 (which are photodiode chips on the substrate 103) on the lower portion of the frame 101. These light receiving portions convert the received light into electrical signals.

The first preferred embodiment of the present invention is characterized by the fact that the image sensor 100 comprises positioning portions 111 formed in the frame 101 at appropriate locations for receiving and positioning a light receiving sensor substrate 103, a stopper engaging and receiving portion 112 formed in the frame 101 at an appropriate location, and a leaf spring 102 including a stopper 121 adapted to detachably engage the stopper engaging and receiving portion 112 and to resiliently bias the light receiving sensor substrate 103 properly disposed at the positioning portions 111 against the frame 101 such that the light receiving sensor substrate 103 can be detachably held against the frame 101.

The frame 101 includes a cavity 123 extending upwardly from the bottom of the frame 101 and adapted to receive the light receiving sensor substrate 103 and the leaf spring 102. The cavity 123 has an opened bottom end, with the closed top end being adjacent to the positioning portions 111 (which are adapted to position the light receiving sensor 105 in association with the optical system 106). In the illustrated embodiment, these positioning portions 111 are in the form of a recess receiving the corresponding edge corner of the light receiving sensor substrate 103. Said stopper engaging and receiving portion 112 is in the form of an engaging step formed in the receiving cavity 123 at the opened bottom end thereof, the engaging step 112 being adapted to be engaged by the stopper 121 of the leaf spring 102, as will be described.

The leaf spring 102 may be in the form of a rectangular flat plate with said stopper 121 integrally formed at one end which extends outwardly from one end of the spring at a right angle. The leaf spring 102 has a length larger than the width of the receiving cavity 123. When the leaf spring 102 is deformed into a curved configuration as shown in FIG. 1 within the receiving cavity 123 as will be described in detail, the light receiving sensor substrate 103 will be resiliently biased against the frame 101 under the returning force of the deformed leaf spring 102.

On assembling, the light receiving sensor substrate 103 is first inserted into the receiving cavity 123 with the light receiving sensor substrate 103 being received at one edge corner by the corresponding positioning portion (recess) 111. In such a state, the leaf spring 102 is then inserted into the receiving cavity 123 from one end. The one end of the leaf spring 102 is engaged by the part of the receiving cavity 123 which is opposite to the engaging step 112. The leaf spring 102 is further moved into the receiving cavity 123 using this engaging part of the spring as a fulcrum. Thus, the leaf spring 102 will be deformed into a curved configuration. At this time, the central portion of the curved leaf spring 102 engages and presses the light receiving sensor substrate 103 against the bottom face of the frame 101. The other end of the leaf spring 102, that is, the end having the stopper 121 is then moved into the receiving cavity 123 with the stopper 121 being engaged by the inside of the engaging step 112. The light receiving sensor substrate 103 is firmly held against the frame 101. In such a manner, the light receiving sensor substrate 103 can be accurately positioned and held relative to the bottom of the frame in an easy and simple manner. If a plurality of such leaf springs 102 (e.g. three springs) are used, for example, in an elongated frame, they may be mounted respectively at the opposite ends and intermediate part of the frame to hold an elongated light receiving sensor substrate firmly.

In the first embodiment, the optical system 106 conducting the light reflected by the original A to the light receiving sensor 105 has a lateral width equal to about 2.8 mm while the opening through which the light is conducted from the optical system 106 to the light receiving sensor 105 is in the form of a cylinder having a diameter equal to about 1.2 mm. On the other hand, the light receiving sensor 105 is 12 mm square while a gap between the substrate 103 and the frame 101 has a width equal to about 0.2 mm. Even if the substrate 103 is deviated laterally, therefore, the light receiving sensor 105 will not be deviated from the opening 121 due to the dimensional relationship between the opening 121 and the light receiving sensor 105. As a result, a problem of the lateral deviation of the substrate 103 can be overcome by the present invention. The substrate 203 may thermally expand in its longitudinal direction, but will not expand much in the transverse direction.

In the first embodiment thus formed, the light from the LED chip 142 is condensed onto the original A through the glass plate 107 by the plastic lens 143. The light reflected by the original A is condensed onto the light receiving sensor 105 on the substrate 103 through the optical system 106, the substrate 103 being pressed against the frame 101 by means of the leaf spring 102. At the light receiving sensor 105, the light is converted into electric signals indicating changes in the intensity of light. Thus, the pattern on the original A will be detected by the image sensor.

Figure 2:
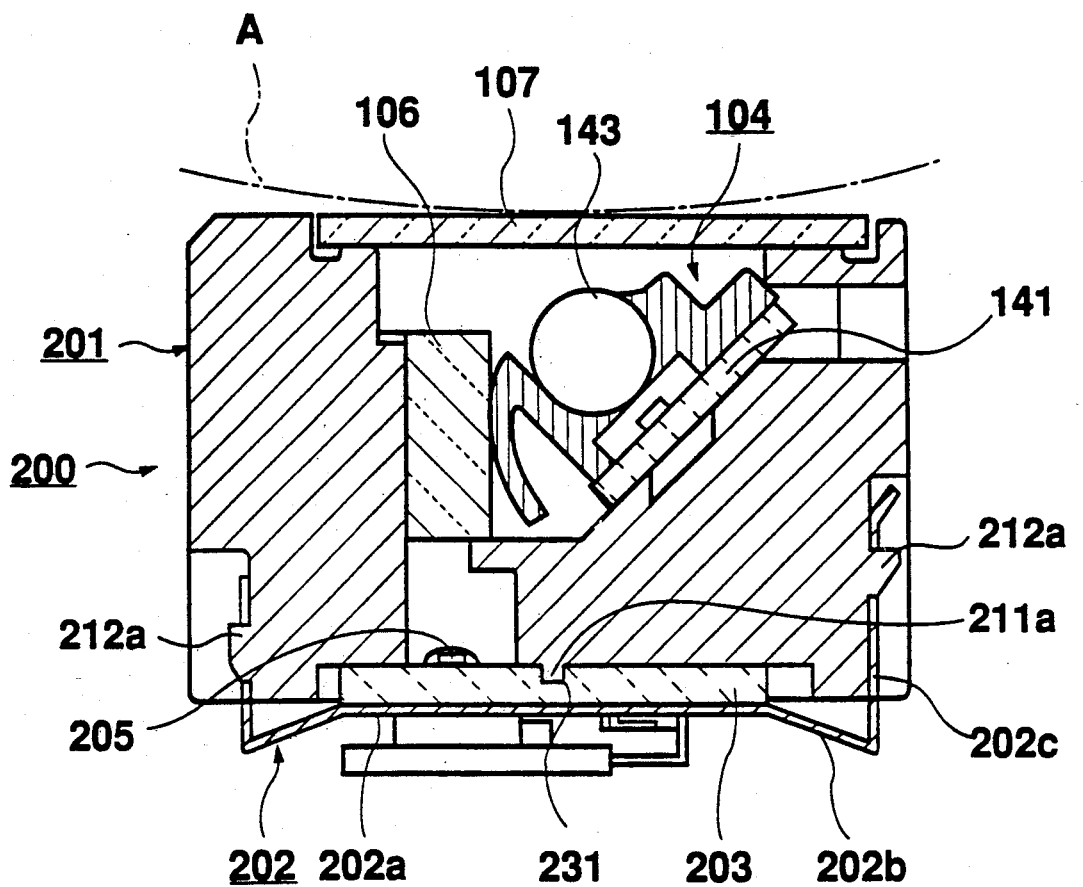
FIG. 2 is a cross-sectional view of the primary parts of an image sensor which is the second preferred embodiment of the present invention.
Figure 3:
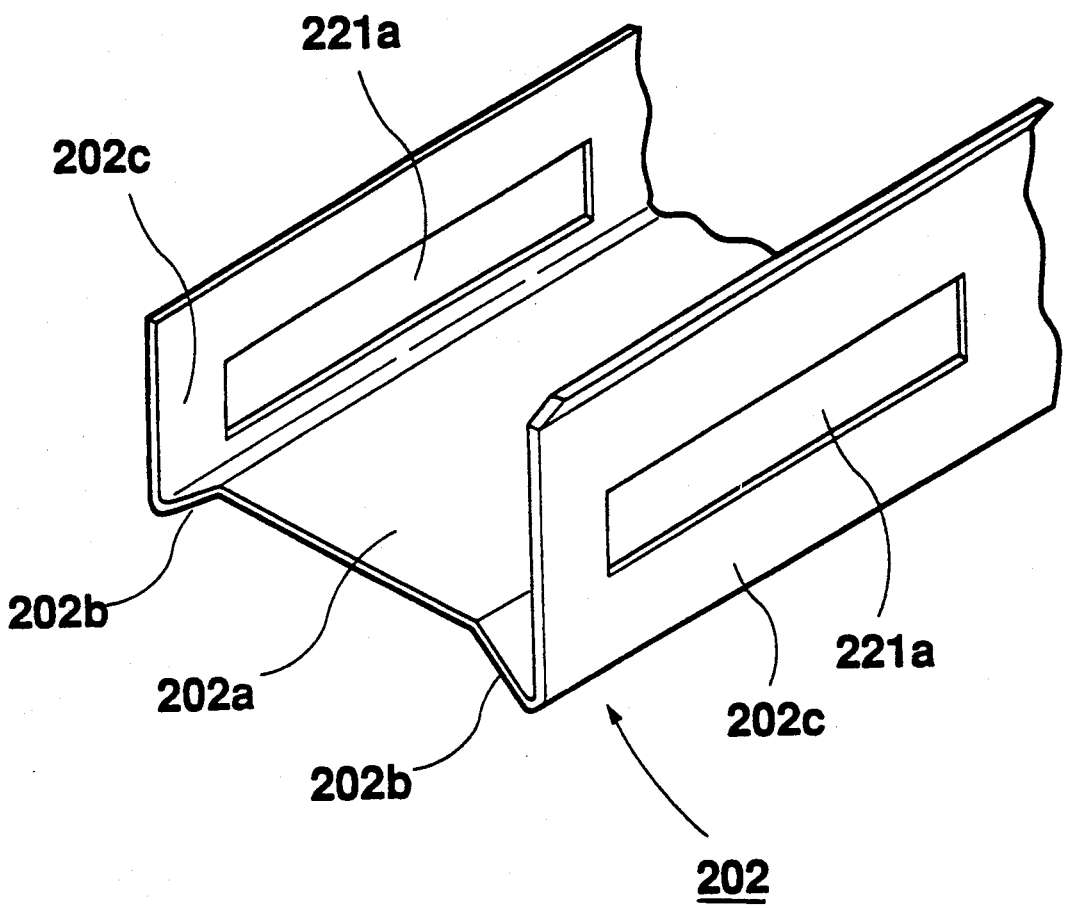
FIG. 3 is an enlarged, fragmentary and perspective view, of the leaf spring used in the second preferred embodiment of the present invention.
Figure 4:
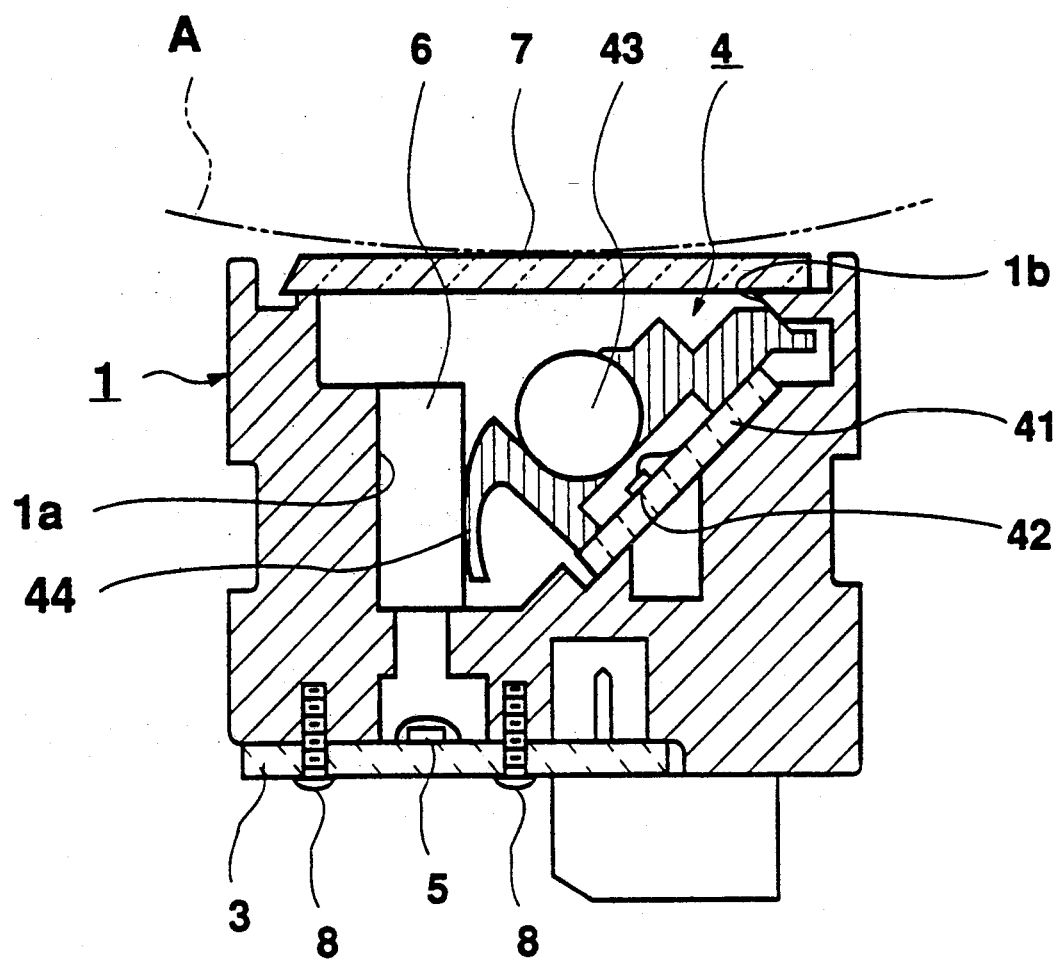
FIG. 4 is a cross-sectional view of the primary parts of an image sensor constructed in accordance with the prior art.

FIG. 2 is a cross-sectional view of the primary parts of an image sensor 200 which is the second preferred embodiment of the present invention. Although the first embodiment has been described as to the receiving cavity 123 extending upwardly from the bottom of the frame 101, the second embodiment is different from the first embodiment in that the image sensor 200 of the second embodiment does not include the receiving cavity 123. Instead, the image sensor 200 comprises a leaf spring 202 detachably attached directly to the bottom of a frame 201. More particularly, the opposite side walls of the frame 201 are formed with projections 212a functioning in a manner as one corresponding to the spring engaging portions of the receiving cavity 123 in the first embodiment. The bottom face of the frame 201 includes a positioning pin (reference pin) 211a formed thereon extending downwardly. As seen from FIG. 3, the leaf spring 202 is an integral continuous member which comprises a horizontal pressing plate portion 202a, a sharply angled spring portion 202b folded outwardly from each end of the horizontal pressing plate portion 202a, and a vertical portion 202c connected with the corresponding spring portion 202b. Each of the vertical portions 202c includes a stopper opening (window) 221a formed therein to be engaged by the corresponding projection 212a of the frame 202. On assembly, the positioning pin 211a is fitted into a hole 231 formed in a light receiving sensor substrate 203.

In the second embodiment, the light receiving sensor substrate 203 is placed in contact with the bottom face of the frame 201 with the positioning pin 211a being fitted into the hole 231 on the light receiving sensor substrate 203. After the light receiving sensor substrate 203 has been properly positioned on the frame 201 in such a manner, the leaf spring 202 is pressed directly against the light receiving sensor substrate 203 at the side opposite to the frame 201. At this time, each of the sharply angled spring portions 202b is opened outwardly and then the vertical portion 202c is brought into contact with the corresponding side wall of the frame 201. Thus, the window 221a of that vertical portion 202c is engaged by the corresponding one of the projections 212a. The light receiving sensor substrate 203 will be resiliently pressed against the bottom face of the frame 201 by the horizontal pressing plate portion 203 under the displacement of the sharply angled spring portion 202b.

The second embodiment is characterized by the fact that in place of the leaf spring 102, the leaf spring 202 attached to the frame 201 through the engagement of the openings with the projections 212a is used to hold the light receiving sensor substrate 203 firmly against the frame 201.

In the image sensor constructed according to the second embodiment, the light reflected by the original A is condensed onto the light receiving sensor 205 through the optical system 106, the light receiving sensor 205 being firmly held against the frame 201 by the leaf spring 202.

As will be apparent from the foregoing, the image sensor of the present invention has the frame positioning portions for mounting the light receiving sensor substrate on the frame and the stopper engaging and receiving portion, these portions being formed on the frame at appropriate locations. The light receiving sensor substrate is firmly held against the frame by means of the leaf spring. Consequently, the light receiving sensor substrate can be properly positioned relative to the frame with increased accuracy and is firmly held against the frame in a simple manner without the need for any troublesome and expensive assembling and machining operations which would be otherwise required by the prior art.

We claim:

1. An image sensor comprising a light source for irradiating light onto an original to be read and a light receiving element for receiving the light reflected by said original, the pattern on said original being detected by detecting the light reflected from said original, said image sensor further comprising:
   (1) a light receiving sensor substrate including a light receiving element for receiving the light reflected by said original;
   (2) pressing menas including a resilient member; and
   (3) a frame in which said light receiving sensor substrate and pressing means are mounted, said frame including
      (a) first engaging portion for engaging said light receiving sensor substrate; and
      (b) second engaging portion engaged by said pressing means.

2. An image sensor comprising a light source for irradiating light onto an original to be read and a light receiving element for receiving the light reflected by said original, the pattern on said original being detected by detecting the light refrected from said original, said image sensor further comprising:
   (1) a light receiving sensor substrate including a light receiving element for receiving the light reflected by said original;
   (2) pressing means including a resilient member; and
   (3) a frame in which said light receiving sensor substrate and pressing means are mounted, said frame including
      (a) a receiving portion for receiving said light receiving sensor substrate and pressing means;
      (b) first engaging portion formed in said receiving portion for engaging said light receiving sensor substrate; and
      (c) second engaging portion engaged by said pressing means and also formed in said receiving portion.

3. An image sensor as defined in claim 2 wherein said pressing means is in the form of a plate made of a resilient material, the opposite ends of said plate engaging said second engaging portion while the central portion of said plate is engaging and biasing said light receiving sensor substrate toward said frame, whereby said light receiving sensor substrate can be biased from the interior of said receiving portion toward said frame to press said light receiving sensor substrate against said second engaging portion.

4. An image sensor as defined in claim 3 wherein said pressing means is in the form of a resilient plate having its central portion outwardly convex.

5. An image sensor comprising a light source for irradiating a light onto an original to be read and a light receiving element for receiving the light reflected by said original, the pattern on said original being detected by detecting the light reflected from said original, said image sensor further comprising:
(1) a light receiving sensor substrate including a light receiving element for receiving the light reflected by said original;
(2) pressing means including a resilient member; and
(3) a frame in which said light receiving sensor substrate and pressing means are mounted, said frame including
(a) an engaging portion for engaging said light receiving sensor substrate; and
(b) a holding portion for holding said pressing means.

6. An image sensor as defined in claim 5 wherein said pressing means is in the form of a plate made of a resilient material, the opposite ends of said plate being held by said holding portion while the central portion of said plate is engaging and biasing said light receiving sensor substrate toward said frame, whereby said light receiving sensor substrate can be biased from the interior of said receiving portion toward said frame to press said light receiving sensor substrate against said engaging portion.

7. An image sensor as defined in claim 5 wherein said pressing means has a substantially W-shaped configuration.

8. An image sensor as defined in claim 5 wherein said frame and light receiving sensor substrate include means for preventing said light receiving sensor substrate from being deviated laterally.

9. An image sensor as defined in claim 6 wherein said frame and light receiving sensor substrate include means for preventing said light receiving sensor substrate from being deviated laterally.

10. An image sensor as defined in claim 7 wherein said frame and light receiving sensor substrate include means for preventing said light receiving sensor substrate from being deviated laterally.

11. An image sensor as defined in claim 8 wherein said means for preventing the light receiving sensor substrate from being deviated laterally includes at least one protruding portion formed in either of said frame or said light receiving sensor substrate, at an appropriate location, and a recessed portion formed in that one of said frame or said light receiving sensor substrate which does not have the protruding portion at a position corresponding to said protruding portion, said recessed portion being engaged by said protruding portion.

12. An image sensor as defined in claim 9 wherein said means for preventing the light receiving sensor substrate from being deviated laterally includes at least one protruding portion formed in either of said frame or said light receiving sensor substrate at an appropriate location and a recessed portion formed in that one of said frame or said light receiving sensor substrate which does not have the protruding portion at a position corresponding to said protruding portion, said recessed portion being engaged by said protruding portion.

13. An image sensor as defined in claim 10 wherein said means for preventing the light receiving sensor substrate from being deviated laterally includes at least one protruding portion formed in either of said frame or said light receiving sensor substrate at an appropriate location and a recessed portion formed in that one of said frame or said light receiving sensor substrate which does not have the protruding portion at a position corresponding to said protruding portion, said recessed portion being engaged by said protruding portion.

* * * * *